United States Patent [19]

Petit

[11] Patent Number: 4,794,938

[45] Date of Patent: Jan. 3, 1989

[54] VEHICLE WASHING DEVICE

[76] Inventor: Thomas J. Petit, 6170 S. Oval Dr., Clinton, Ohio 44216

[21] Appl. No.: 37,248

[22] Filed: Apr. 10, 1987

[51] Int. Cl.⁴ .............................................. B60S 3/04
[52] U.S. Cl. .................................. 134/57 R; 134/123; 134/181
[58] Field of Search ..................... 134/45, 57 R, 58 R, 134/123, 180, 181; 15/DIG. 2

[56] References Cited

U.S. PATENT DOCUMENTS

| | | | |
|---|---|---|---|
| 3,196,888 | 7/1965 | Rousseau | 134/45 |
| 3,410,284 | 11/1968 | Burger | 134/123 X |
| 3,559,659 | 2/1971 | Gougoulas | 134/45 |
| 3,854,054 | 12/1974 | Conn, Jr. | 15/DIG. 2 |
| 4,562,848 | 1/1986 | Messing et al. | 15/DIG. 2 |

FOREIGN PATENT DOCUMENTS

2164498 7/1973 Fed. Rep. of Germany ...... 134/123

Primary Examiner—Philip R. Coe

[57] ABSTRACT

A device for washing automobiles, vans, and other vehicles is shown which comprises a movable spray bar with high velocity spray nozzles mounted thereon, as well as associated supporting structure, and motion inducing means. In the washing process, the lateral profile of the vehicle is tracked by an array of photoelectric cell detectors mounted on the spray bar. Based on electronic output signals from the detectors, which are processed by a preprogrammed logic control unit and relayed to the motion inducing means, the spray bar is maintained at a predetermined height above, and the nozzles at a constant angle to, the vehicle surfaces being washed.

7 Claims, 5 Drawing Sheets

VEHICLE WASHING DEVICE

This invention relates to a device for washing vehicles, especially automobiles and vans. More particularly, this invention relates to a device for washing vehicles by means of high velocity jet sprays emanating from nozzles directed so that the sprays impact the surface to be washed at a constant angle thereto. Specifically, this invention relates to a car washing device, and to a process employing it, involving the use of a spray bar equipped with high velocity spray emitting nozzles that is moved over the upper surfaces of the vehicle being washed. During the process, the spray bar, and therefore the nozzles incorporated therein, are maintained at a constant angle relative to the contours of the surfaces encountered, thereby producing a stream of wash liquid that impacts such surfaces at a constant, optimal angle.

BACKGROUND OF THE INVENTION

Part of the routine maintainence of automobiles involves the periodic removal of dirt and grime accumulated in the course of their operation, from the surfaces thereof. Not only does such removal enhance the appearance of the vehicle, but the life of the vehicle is prolonged since such dirt, particularly salt accumulation, if left undisturbed destroys the luster of the vehicle's paint, and produces corrosion of the metallic parts. In the past, such removal has been accomplished by washing the car with water, more desirably with soap and water, sometimes followed by the application of a protective film of wax. While washing previously was manually performed, automated equipment, which is faster and less expensive since it reduces labor costs, has for the most part superseded the old-fashioned, manual operation.

Until relatively recently, automated washing consisted of slowly moving the automobile through a succession of rotating brushes, oscillating draped strips, sequential sprays of soap and water, and similar steps. While wash lines of the brush type have, for the most part, successfully removed dirt and grime accumlated on the automobile's exposed surfaces, they have also been responsible for producing scratch patterns on the painted surfaces. The scratch problem has become even more serious as the industry has moved to the softer, high luster paints. Furthermore, while the contacting brushes provide a positive washing action, they are incapable of reaching recessed surfaces of the automobile, and thus have been unable to eliminate all of the accumulated soil. An additional disadvantage of wash lines depending upon physical contact with brushes and the like, stems from the fact that such procedures necessarily require extensive, complex mechanical machinery which is not only expensive, but which requires considerable space, and is prone to frequent break-down.

As a result of the described defciencies, the car wash industry has recently begun to install wash lines which rely on high pressure wash water jets to remove automotive dirt. Since such devices require fewer mechanical components, they are less susceptible to mechanical breakdown, and the ability of the streams to penetrate into hard to reach areas, enables the wash system to produce a superior job. One such device and system is taught by U.S. Pat. No. 4,562,848, which discloses a frame with pressure nozzles and photo electric cells mounted thereon. As an automobile passes through the device, the frame pivots in an arcuate motion over its top, while the nozzles are continuously adjusted to provide the necessary clearance relative to the surfaces being washed. Initially, as the automobile enters the device, the wash nozzles are directed toward the entering vehicle. However, the nozzles are automatically readjusted while the frame pivots, and as the automobile proceeds, until at the end of the arc they have swung to a point at which the wash streams emanating therefrom are pointing opposite to the direction in which they were originally positioned. While the device of the patent is superior to wash devices relying on brushes, it suffers from the fact that the angle of the wash streams with respect to the car surfaces, represents a compromise. In this regard, in order to achieve optimum washing action, a wash stream should be directed at approximately right angles to the surface of the automobile. When, however, a wash nozzle is slowly repositioned through 180°, without reference to the nature of the surface passing beneath it, the angle of stream impact will vary, depending upon the position of the surface being washed. Sometimes the impact angle will be in a desirably perpendicular position relative to an automobile surface; more frequently, however, it will impinge at an angle other than 90°. In addition, when such a frame approaches the mid-point of the vehicle being washed, the nozzles will be pointing generally toward the approaching vehicle, while when the vehicle proceeds past the mid-point of the arc, the nozzles will point generally in the direction of the receding vehicle, producing an impact angle that tends to push removed dirt back over the surface area just cleaned.

A first aspect of this invention, therefore, is to provide a vehicle washing device capable of performing a wash function without abrading brushes.

A second aspect of the invention is the provision of a vehicle wash device that directs wash streams onto the vehicle surface at an optimum angle.

Another aspect of this invention is to provide a device with wash nozzles directed so as to avoid directing removed dirt onto previously washed surfaces.

Yet another aspect is to make available a simple, durable, inexpensive washing device that can be installed in a limited space.

The foregoing and other aspects of the invention are achieved in a vehicular washing device comprising in combination: lateral vehicle profile detection means; a horizontal spray bar adapted to distribute wash liquids; spray bar vertical positioning means; spray bar rotation means; supporting structure for the preceeding, and a logic control unit.

Still other aspects of the invention are achieved by the process of washing a vehicle comprising subjecting all exposed upper vehicle surfaces disposed at substantially right angles to the vehicles sides, sequentially from one end of the vehicle to the other, to a plurality of streams of wash liquid, wherein the angle of said streams relative to the surfaces impacted is maintained substantially constant.

BRIEF DESCRIPTION OF THE DRAWINGS

The invention will be better understood when reference is had to the following drawings, in which like numbers refer to like parts, wherein:

FIGS. 4A through M, is a side elevation view of a four cell locator unit, and a diagramatic representation of the locator unit scanning a lateral profile.

FIGS. 5A through K, is a side elevation of a two cell locator unit, and a diagrammatic representation of the locator unit scanning a lateral profile;

DETAILED DESCRIPTION OF THE INVENTION

Figure 1:
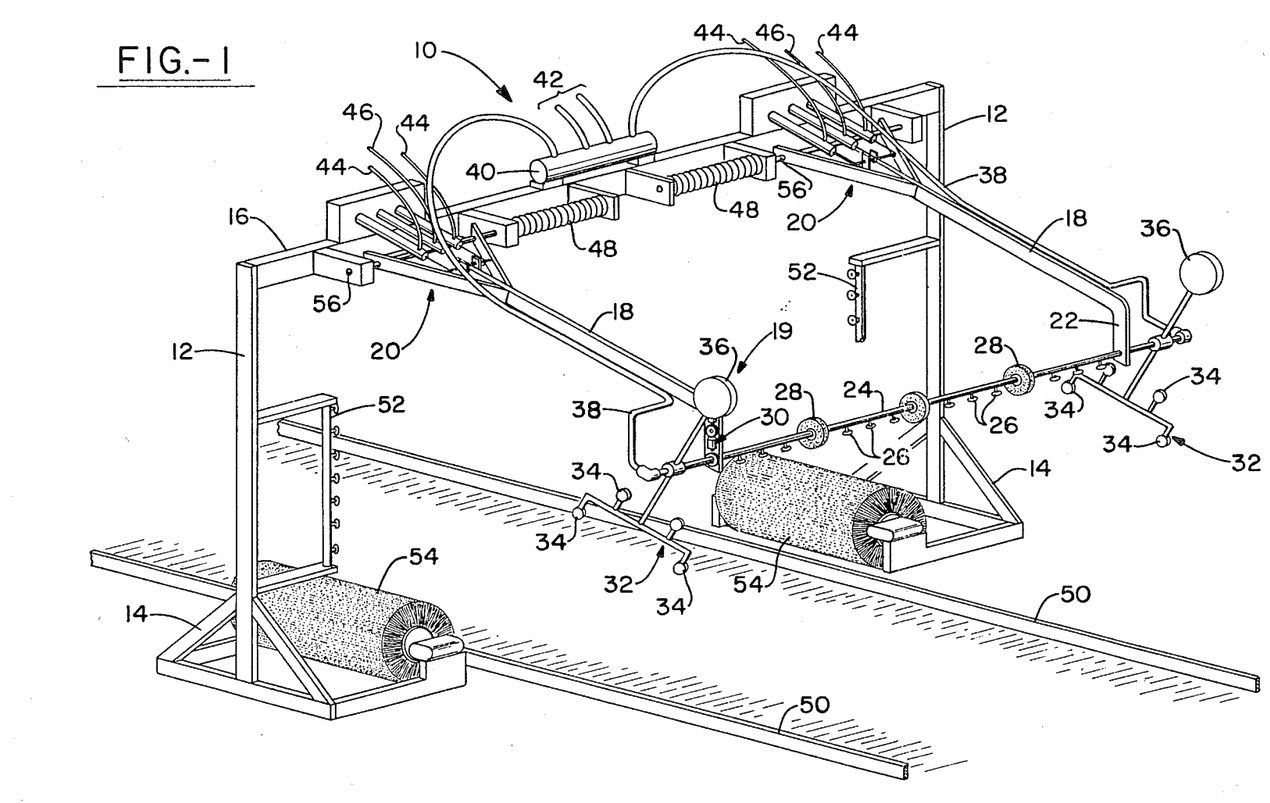
FIG. 1 is an isometric view of the vehicle washing device of the invention.

FIG. 1 is an isometric view of the vehicle washing device of the invention, indicated generally by the numeral 10, including vertical support stanchions 12, supported by base supports 14, and connected by horizontal support beam 16. Support arms, shown generally by 19, extend from horizontal support beam 16, comprising pivot arms 18, with hanger bars 22 angled downward therefrom. Rotatably attached to hanger bars 22 is spray bar 24, to which are attached a number of spray nozzles 26, and protector rollers 28. Spray bar 24 is rotated by means of a spray bar rotator, shown generally by 30, as directed by electronic signals generated by photoelectric cells 34 comprising part of the four-cell locator unit, indicated generally by the numeral 32. Counter-weights 36 substantially balance the weight of the locator unit, enabling it to be rotated with minimum force by the spray bar rotator 30. The various fluids used in the washing process are received by the spray bar through spray bar feed lines 38 from feed manifold 40, which is supplied in turn through manifold feed lines 42. The Figure also shows transport track 50, as well as side sprays 52, and wheel brushes 54.

During the wash process, a vehicle is moved through the "inverted U" shaped wash frame, i.e., formed by vertical support stanchions 12 together with horizontal support beam 16, either as a consequence of propelling the car through a stationary wash frame on transport track 50 or by equivalent means, or by moving the wash frame past a stationary automobile. As the car proceeds through the wash frame, it encounters the photoelectric cells of the locator unit 32, about which more will be said later. The photoelectric cells 34 generate signals which depend upon the nature of the automobile profile scanned by them. These signals are processed by a logic control unit, not shown, which in turn generates signals for control of the pivot actuator assembly 20, and spray bar 24. Signals received by the pivot actuator assembly 20 cause the assembly to raise or lower the supporting arms 19, thereby adjusting spray bar 24 verically, while signals received by spray bar rotator 30 produce rotation of the spray bar, directing spray nozzles 28 accordingly. As the car proceeds past the spray bar 24, the vertical height of the spray bar tracks the vertical height of the exposed vehicle surfaces substantially perpendicular to the side of the automobile, while the spray nozzles 26 are adjusted so that they maintain a constant preset angle relative to such surfaces. As the car passes through the wash frame, its lateral surfaces are cleansed by high pressure washing fluids directed from side sprays 52, while the wheels are washed, for example, with wheel brushes 54, supported, deployed, and operated in any of the ways known in the art.

The wash frame, support arms 19, and other structural components of the vehicle washing device may be fabricated from metals such as carbon steel, stainless steel, aluminum, or others, individual components having structural dimensions suitable for contending with the stresses to which they are subjected. In this regard, structural components such as the vertical support stanchions 12, the base support 14, the horizontal support beam 16, and the support arms 19 will usually be from about 4 to 8 inches square. The overall dimensions of the wash frame itself will depend upon the nature of the vehicles to be processed, whether automobiles, vans, or otherwise; however, typically, the vertical support stanchions 12, will be from about 8 to 10 feet apart, while the hortizontal support beam 16 will be positioned about 7 to 10 feet above the surface on which the vehicle rests. Although FIG. 1 shows spray bar 24 suspended from support arms 19, the washing device might also be constructed so that the spray bar would move vertically up and down on means disposed substantially between the vertical support stanchions 12. The support arm 19 can be fabricated as an in-line structure comprised of straight pivot arms 18 with spray bar 24 deployed at the end thereof. Preferably, however, support arms 19 are fabricated as an "L" shaped structure with hanger bars 22 being deployed from pivot arms 18 at an angle of from about 120°-150°. Separate wash frames may be provided for each part of the wash cycle, e.g., soap, water, wax, or air, or such treatments may be provided with a single wash frame in sequentially passes, the function of which is controlled by an appropriate control unit.

Figure 2:
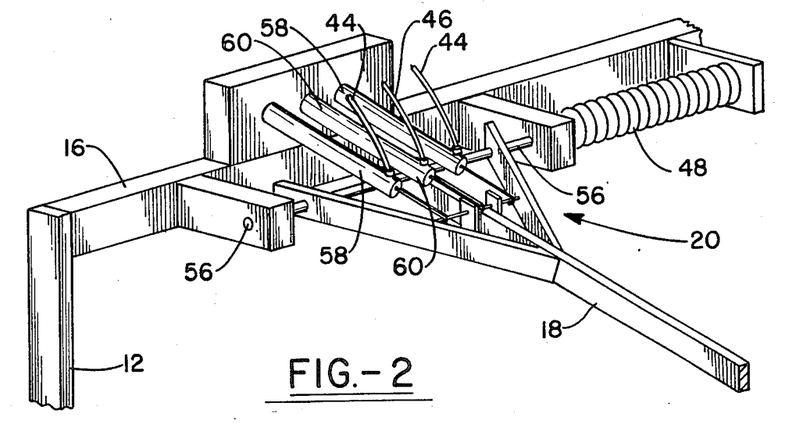
FIG. 2 is an isometric view of one of the pivot actuator assemblies of the invention.

FIG. 2 shows an isometric view of a pivot actuator assembly, generally 20, mounted on a wash frame which includes vertical support stanchions 12 connected by horizontal support beam 16. The figure shows how pivot arm 18 can be constructed, and how it can be rotated about horizontal support beam 16 on pivot bar 56. Upward rotation of the pivot arm 18 is induced by actuation of hydraulic cylinder 60 with hydraulic fluids supplied through hydraulic line 46. Downward movement of pivot arm 18 can depend upon gravity. In order to minimize the amount of force need to raise pivot arm 18, "trim" means are preferably provided to counteract the force of gravity pulling the arm downward. Such means may comprise pneumatic cylinders 58, supplied through air lines 44, or a torsion spring 48, or a combination of both. While FIG. 2 shows a particular form of pivot scheme, the invention is not restricted thereto. Similarly, although two pneumatic cylinders are shown for trim purposes, a single cylinder could be employed for the purpose.

Figure 3:
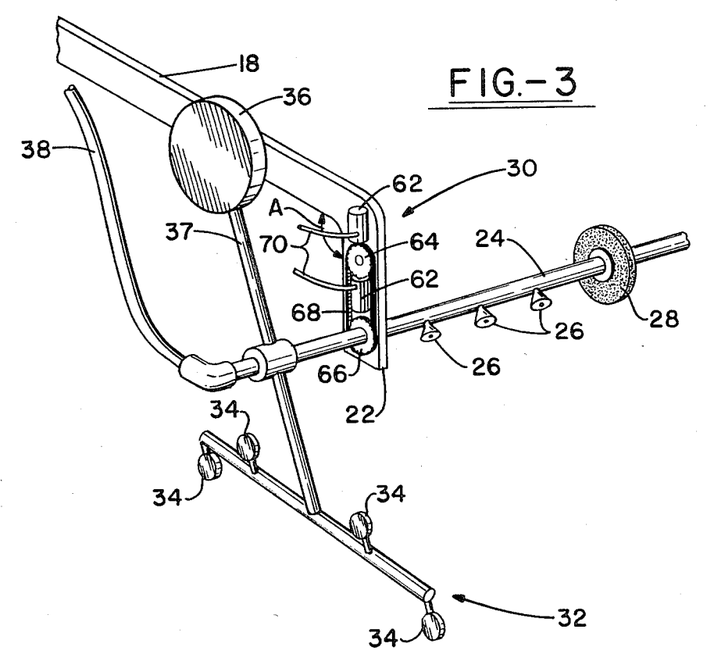
FIG. 3 is an isometric view of a locator unit, a spray bar supporting arm, and a spray bar rotator of the invention.

FIG. 3 shows an isometric view of a locator unit 32, attached to a spray bar 24, supported by hanger bar 22. In the Figure, the locator unit 32 comprises an assembly of four photoelectric cells 34, and a counterweight 36 mounted on an associated structure 37 attached to spray bar 24. The spray bar 24, which is supplied with various washing materials through spray bar feed line 38 is rotated by means of spray bar rotator 30. As shown, spray bar rotator 30 comprises sprocket wheels 64 and 66, connected by drive chain 68. Sprocket wheel 64 is driven by appropriate connection to opposing hydraulic cylinders 62, supplied with hydraulic fluid through hydraulic lines 70. Pivot arm 18 and hanger bar 22 join each other at an angle "A" which may be varied but which is preferably from about 120°–150°, as previously stated. In addition to spray nozzles 26, spray bar 24 is equipped with protector rollers 28 which prevent any unintended contact of the spray bar or nozzles with the surface of the vehicle being washed. During the wash cycle, spray bar 24 is advantageously maintained at from about 4 to 18 inches about the surface being washed, a particularly preferred distance being in the neighborhood of about 10 inches therefrom. The number of spray nozzles 26 located on spray bar 24 may vary, depending upon the particular nozzle selected, its spray arc, and the height of the spray bar 24 above the surface of the vehicle. However, when the spray bar 24 is maintained at about 9 to 10 inches above the vehicle surface, the nozzles 26 will normally be located about 6–10 inches apart. Protector rollers 28, which normally have a diameter of about 4–8 inches, may be made from any relatively soft material such as rubber or plastic. Pressure of the wash water supplied to the spray nozzles 26 will depend upon the nature of the nozzles. Generally, however, the pressure will range from about 900–1500 psi, a pressure of about 1200 psi being typical. The angle of the spray nozzles 26, relative to the surface being washed, may be set at whatever angle is desired, by a mechanical setting of the nozzles 26 relative to the location unit. It has been found, however, to be of considerable advantage to maintain such angle at about 90° with respect to the vehicle surface, since that angle applies the greatest force to dislodge the attached dirt and grime. If desired, spray bar 24 may have a safety switch attached thereto, triggered by contact with the surface of the vehicle. Such contact activates pneumatic cylinders 58, causing the support arm 19 to swing upward away from the vehicle, thereby preventing damage to the vehicle surface in the event of a malfunction of the washing device. While the Figure shows a hydraulically operated spray bar rotator, an electrically driven rotator could also be used.

Figures 4, 4A:
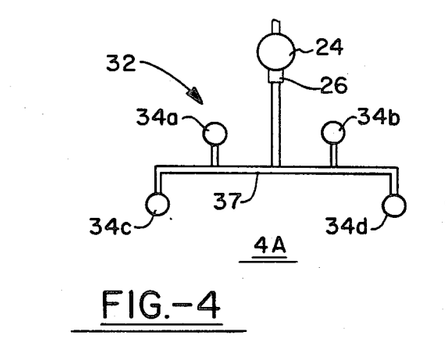

FIGS. 4A through M, presents a partial front elevation of a four-cell locator unit 32 and a diagramatic representation of the locator unit as used in scanning the lateral profile of an automobile. In part A of the figure, the locator unit is shown comprising photoelectric cells 34a, b, c, and d. The cells are connected to spray bar 24, containing spray nozzles 26. The locator unit comprises two groups of photoelectric cells mounted on opposite ends of spray bar 24. One group emits beams of light directed at another receiver group. When the beams are interrupted by an intervening object, a signal is generated and sent to the logic control unit 96 of FIG. 6, where the signals are processed and outputs generated which control the spray bar rotator 30, and pivot actuator assembly 20. The logic control unit 96 operates in accordance with preset instructions, which in the case of the fourcell unit shown in FIG. 4 comprise the following:

If the light beams of 34a or 34b are broken, the locator unit raises until both beams are unbroken, and then continues to rise for 0.2 seconds longer;

If the light beams of cells 34c and 34d are both unbroken, the unit will lower until either or both such light beams are broken, and will then continue to lower for an additional 0.2 seconds;

If the light beam of cell 34c is unbroken and that of 34d is broken, the locator unit will rotate counterclockwise until such light beams are both broken;

If the light beam of 34c is broken and that of and 34d is unbroken, the locator unit will rotate clockwise until the light beams from such cells are both broken, and If the light beams from cells 34c and 34d are either both broken or unbroken, no rotation will occur.

From the preceeding, it will be appreciated that the locator unit 32 can rotate at the same time that the unit is moving up or down. However, instruction to the locator unit 32 to rise takes priority over an instruction for it to lower. Advantageously, cells 34c and 34d are set further apart than cells 34a and 34b in order to facilitate rotation of the locator unit 32, prior to the units up or down movement, thus producing more accurate motion as the locator unit encounters sharp 90° profiles, for example, the steep rear windows in some automobiles. The horizontal and vertical distances between the cells can be changed to achieve whatever tracking accuracy is desired, and to produce the proper distance of the spray bar 24 from the surface being washed. While other dimensions may be selected, it has been found desirable to arrange the cells above the locator unit 32 so that cells 34a and 34b are from about 10–20 inches apart, while cells 34c and 34d are from about 12–20 inches apart. The upper and lower rows of cells, i.e., 34a–34b, and 34c–34d, respectively, are arranged so they are substantially parallel and generally from about 3–8 inches apart, the closer the spacing, the more accurate the tracking. The use of a third photo electric cell centered between the top to cells 34a and 34b increases the accuracy of the unit, but is unnecesary. The third photo cell is more accurate for objects such as luggage racks or pointed bumpers, or any more sharply pointed protusion from the vehicle.

FIGS. 4B through 4M show a partial profile of an intervening lateral vehicle surface 72 being scanned by the photoelectric cells of a locator unit 32. In the Figure, the vehicle is moving in the direction of the adjacent overhead arrow, while the motion of the locator unit 32 is indicated by the arrow located within the cluster of cells, a stable configuration of the cluster being indicated by the letter "S". Only representative movements are shown; for example, those involving simultaneous rotation and verticle movement are not illustrated, although it will be understood that they take place at certain points in the profile scanning process. FIGS. 4B through 4G illustrate scanning of the front of the automobile, while FIGS. 4H through 4M show scanning of the rear part of the automobile.

Figure 5:
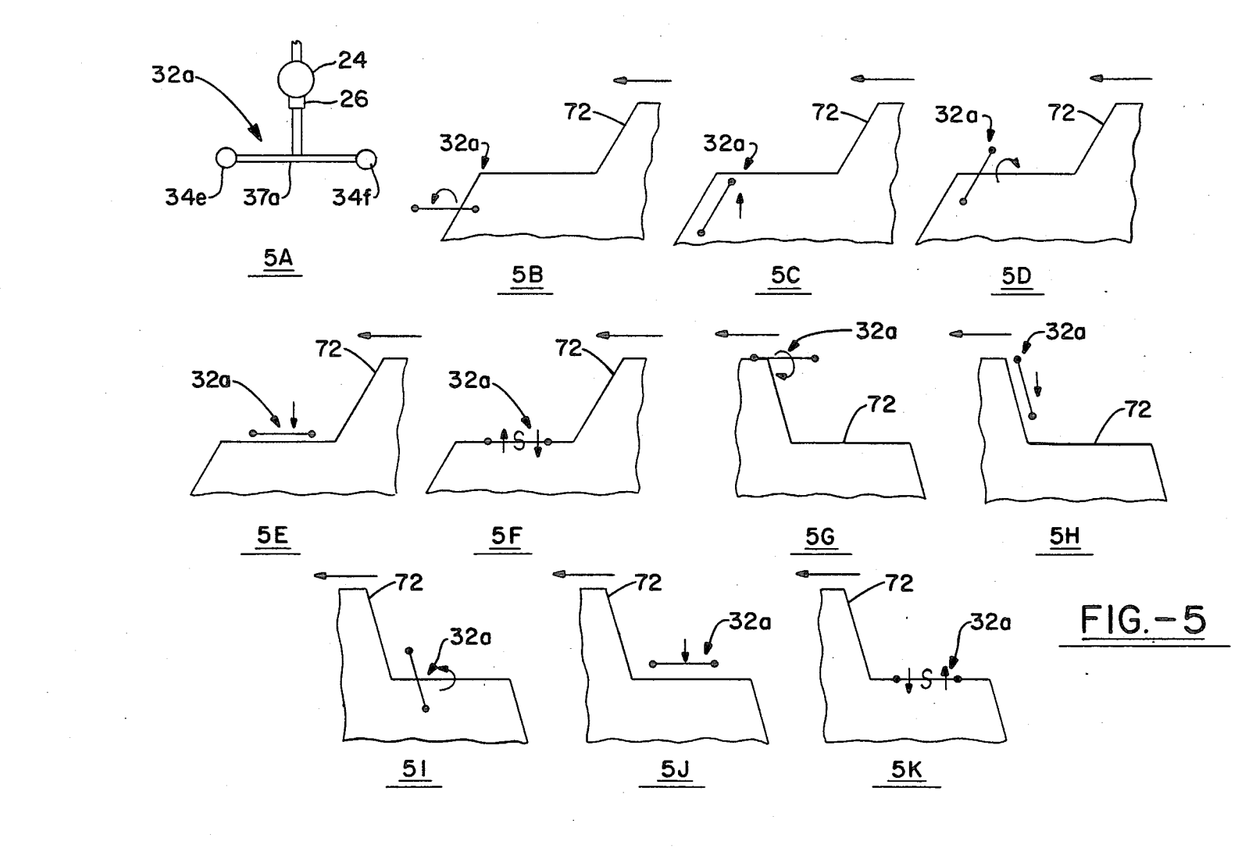

FIG. 5 A shows a partial front elevation of a two-cell locator unit 32a, comprising a single row of photoelectric cells, 34e and 34f attached by associated structure 37a to spray bar 24 and attached spray nozzles 26. While the distance between cells 34e and 34f may also vary, a distance from about 10–20 inches has been found to be of advantage.

Locator unit 32a is similar to the unit of FIG. 4, except that the unit has been simplified by the elimination of the top row of cells. Like the top row of cells of FIG. 4A, however, the locator unit of FIG. 5 operates more accurately if a third cell is added between cells 34e and 34f. The locator unit 32 of FIG. 4 may be used to control either solenoid valves, or three position-four way servo valves. The locator unit 32a of FIG. 5, however, relys on the use of three position-four way servo valves for reasons described hereinafter. An additional difference consists of the fact that the 0.2 second delay previously described, which approximates the time required for the four-cell unit to travel half the distance between the top and bottom rows of eyes, is no longer required, and thus is eliminated. Locator unit 32a of FIG. 5 also operates in conjunction with a logic control unit 96 which has been programmed with the following logic:

If the light beams of 34e or 34f are broken, the unit will rise until the light beams are both unbroken;

If the light beams of cells 34e and 34f are both unbroken, the unit will lower until one or both such light beams are broken;

If the light beam of cell 34e is broken, while the light beam of cell 34f is unbroken, the unit will rotate clockwise, and If the light beam of cell 34e is unbroken while the beam of cell 34f is broken, the unit will rotate counterclockwise.

Elimination of one row of cells means that the locator unit can only be instructed to raise or lower, not stop. However, while the cells search up and down as the beams encounter the profile edge of the automobile, the locator unit attempts to move up and down very rapidly. Since the cells are capable of sensing on-off cycles 400 times a second, this results in a high frequency signal transmission to the servo valve. The valve, however, is incapable of reacting to such rapid signals; consequently, it remains in its neutral position, blocking access of the hydraulic fluid to the valve actuators, thus holding the locator unit 32a in a stationary position. The action of both the four-cell locator unit of FIG. 4, and the two-cell unit of FIG. 5 may be smoothed by the addition of a ramping function, i.e., a time delayed, controlled opening and closing of the servo valves. As in the case of FIG. 4, FIGS. 5B through K shows a partial intervening lateral profile 72 of a vehicle passing through the washing device of the invention in the direction of the overhead horizontal arrow, while the movement of the locator unit 32a is shown by adjacent arrows, in some cases associated with the letter "S", representing a stable position. Again, not all possible scanning situations encountered are represented.

Figure 6:
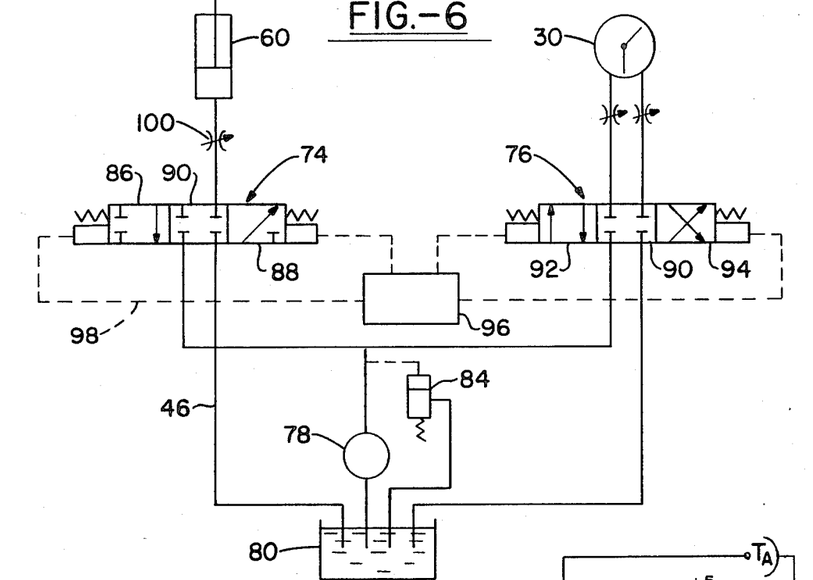
FIG. 6 is a schematic diagram of the hydraulic system of the invention.

FIG. 6 is a schematic diagram of the hydraulic system of the washing device of the invention showing a hydraulic fluid pump 78 supplied with hydraulic fluid from reservoir 80. The pump is connected by a system of hydraulic feed lines 46 to three position-four way valves 74 and 76, respectively. The valve 74, for the pivot arm 18 actuator, includes position 86, which allows hydraulic fluid to return to the reservoir 80; position 88, which permits the pump to supply hydraulic fluid to hydraulic cylinder 60; and a neutral position 90, which maintains the hydraulic fluid status quo. Valve 76, the spray bar 24 rotator valve, comprises position 92, which causes the spray bar to turn in a clockwise direction; position 94, producing a counterclockwise spray bar rotation; and position 90, which prevents any rotation of the spray bar. Included in the hydraulic network are valves 100, which control the rate of movement of hydraulic fluid, and high pressure release valve 84, protecting the system. The Figure also shows logic control unit 96, connected to valves 74 and 76 by means of an electronic network 98. Other variations of the hydraulic network shown can also be employed, the objective simply being to maintain the spray bar 24 at a predetermined distance from the exposed vehicle surfaces substantially perpendicular to the sides of the automobiles being washed, and to rotate the spray bar in a plane at right angles to its logitudinal axis, relative to the spray bar's moveable supporting structure so that the nozzles attached to the spray bar can be positioned at a predetermined angle to the surfaces being washed.

Figure 7:
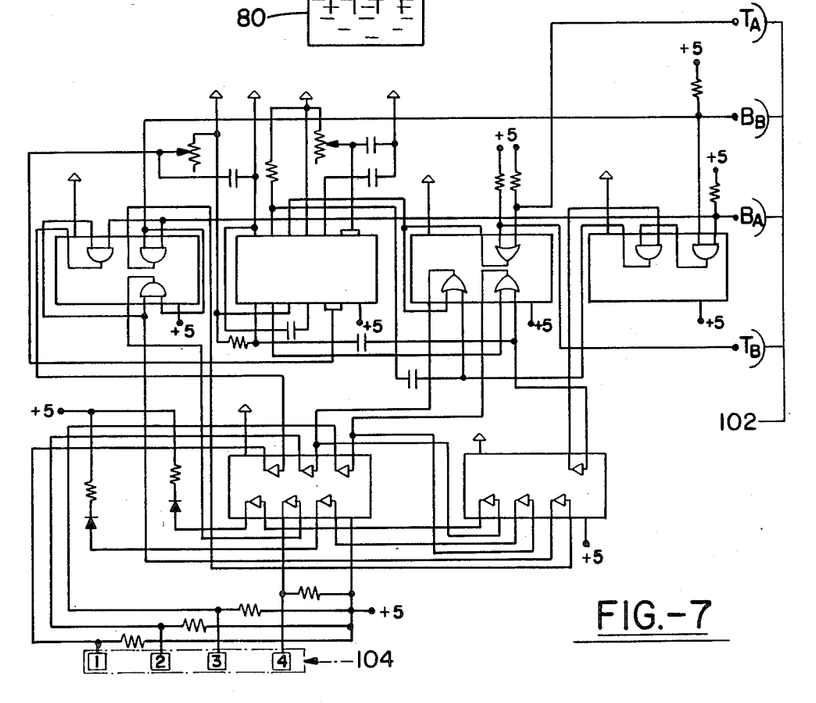
FIG. 7 is a schematic diagram of the electronic logic for converting electronic imput from the photoelectric cells of a locator unit to electronic output suitable for control of solenoid actuated hydraulic valving.

FIG. 7 shows a schematic diagram of one form of electronic logic for converting the electronic outputs from the photoelectric cells to electronic outputs for controlling solenoid actuated hydraulic valving. In the Figure, the terminals indicated generally by the numeral 102 indicate the points in which the intelligence from the photoelectric cells is received, while the terminals indicated generally by the numeral 104 show the points of connection to the operational hydraulic valving. The logic represented can be modified, if desired, provided that proper functional logic is maintained. FIG. 7 represents the logic required for a four-cell locator unit equipped with solenoid valves. If a two-cell unit is employed, or if the actuator unit is to be used in connection with three position-four way servo valves, appropriate alteration of the control logic will be made in accordance with techniques known to those skilled in the art.

The locator units taught in the preceeding involve two or four, optionally three or five cell units, the units being arranged in appropriate rows, attached by suitable associated structure at substantially right angles to the spray bars controlled by the cells. The four, or five, cell unit has the advantage of being more accurate and safer, that is, less likely to cause the spray bar to come into damaging contact with the surface being washed. The two cell unit, on the other hand, has the advantage of necessitating fewer cells and less structure. Although additional cell arrangements could be used, the groupings taught represent substantially minimal control structure, and therefore, are particularly desirable.

While in accordance with the patent statutes, the preferred embodiment and best mode has been presented, the scope of the invention is not limited thereto, but rather is measured by the scope of the attached claims.

What is claimed is:

1. A vehicle washing device comprising in combination:

lateral vehicle profile detection means;
a horizontal spray bar adapted to distribute wash liquids;
spray bar vertical positioning means;
spray bar rotation means;
supporting structure for the preceding, and
a logic control unit, wherein said profile detection means comprises at least two photoelectric cells, the components of which are mounted on, and at opposite ends of said spray bar, and which are adapted to detect the presence of an intervening, lateral vehicle surface, wherein when such presence is detected, electronic signals are sent from said cells to said logic control unit which is adapted to receive said input signals and to process them based upon instructional logic contained in said unit, and based upon such processing, to generate and transmit output signals to said spray bar vertical positioning means which includes moveable spray bar supporting structure adapted to be activated thereby, and raised or lowered according to such logic, and wherein said spray bar has a plurality of spray nozzles attached thereto and is connected to drive means for rotating said spray bar in a plane at right angles to the longitudinal axis of said spray bar relative to said spray bar's moveable supporting structure, said drive means also being controlled by output signals received from said logic control unit, thereby positioning the direction of said spray bar, and therefore of the nozzles attached thereto, at a predetermined, substantially constant perpendicular angle relative to the exposed upper vehicle surfaces that are substantially perpendicular to the sides of said vehicle, and wherein further, said cells are spaced apart laterally from the longitudinal axis of said spray bar, and from each other.

2. A vehicle washing device according to claim 1 in which said profile detection device includes an array of photoelectric cells comprising two vertically spaced parallel rows of at least two cells each, and wherein the distance between the cells at each end of one row is greater than the distance between the cells at each end of the other row.

3. A vehicle washing device according to claim 1 in which said profile detection device includes an array of photoelectric cells comprising one row of at least two cells.

4. A vehicle washing device according to claim 1 in which said movable spray bar supporting structure and said drive means for rotating said spray bar are activated by hydraulic cylinders.

5. A vehicle washing device according to claim 1 in which said supporting structure comprises an inverted, substantially U shaped wash frame wide enough to accomodate passage of the vehicle therethrough, with two spaced support arms pivotally attached to a top, horizontal member thereof, and extending therefrom, said spray bar being pivotally, horizontally attached between contilevered of said support arms, and said support arms being pivotable up and down in an arc about the pivot points of attachment.

6. A vehicle washing device according to claim 1 in which said supporting structure includes an inverted, substantially U shaped supporting frame comprising two vertical support members connected at the top thereof by a horizontal member, said vertical members being spaced sufficiently far apart to permit the vehicle to pass there between, and wherein said spray bar vertical positioning means moves said spray bar vertically up and down, substantially between said vertical support members.

7. A vehicle washing device according to claim 1 in which there is included means to produce relative movement between said device and the vehicle to be washed.

* * * * *